(12) United States Patent
Ponert

(10) Patent No.: US 7,289,040 B2
(45) Date of Patent: Oct. 30, 2007

(54) DEVICE FOR DETECTING VEHICLES

(75) Inventor: Gregor Ponert, Salzburg (AT)

(73) Assignee: Skidata AG, Gartenau (AT)

(*) Notice: Subject to any disclaimer, the term of this patent is extended or adjusted under 35 U.S.C. 154(b) by 229 days.

(21) Appl. No.: 11/251,620

(22) Filed: Oct. 14, 2005

(65) Prior Publication Data

US 2006/0109142 A1     May 25, 2006

(30) Foreign Application Priority Data

| Oct. 16, 2004 | (EP) | ................................. 04024715 |
| Nov. 5, 2004 | (EP) | ................................. 04026348 |

(51) Int. Cl.
*G08B 1/01* (2006.01)

(52) U.S. Cl. ........................ 340/941; 340/551; 324/200

(58) Field of Classification Search ................ 340/941, 340/551; 324/200
See application file for complete search history.

(56) References Cited

U.S. PATENT DOCUMENTS

| 2,201,146 A | 5/1940 | Barker |
| 3,587,012 A | 6/1971 | Piekarski |
| 6,724,191 B1 | 4/2004 | Larsen |

FOREIGN PATENT DOCUMENTS

| DE | 101 23 223 A1 | 12/2002 |
| DE | 102 16 760 A1 | 10/2003 |
| DE | 103 21 201 A1 | 12/2004 |
| EP | 0 049 949 A2 | 4/1982 |
| EP | 1 193 662 A1 | 4/2002 |
| WO | WO 2004/100075 A1 | 11/2004 |

OTHER PUBLICATIONS

Search Report dated Jan. 12, 2005 in European Application No. 04024715.7 (2 pages).
Caruso, M.J., et al., "Vehicle Detection and Compass Applications using AMR Magnetic Sensors", *Proceedings Sensors Expo Baltimore*, Helmers Publishing, Peterborough, NH, 1999, pp. 477-489.

*Primary Examiner*—Jeffery Hofsass
*Assistant Examiner*—Hongmin Fan
(74) *Attorney, Agent, or Firm*—Flynn, Thiel, Boutell & Tanis, P.C.

(57) ABSTRACT

A magnetic field sensor is provided alongside a roadway in order to detect vehicles. A permanent magnet is installed in the roadway at such a distance from the magnetic field sensor that the magnetic field of the permanent magnet is stronger than the geomagnetic field at the magnetic field sensor

8 Claims, 1 Drawing Sheet

DEVICE FOR DETECTING VEHICLES

FIELD OF THE INVENTION

The invention pertains to a device for detecting vehicles by means of a magnetic field sensor. The device also has a number of other applications.

BACKGROUND OF THE INVENTION

Currently, induction loops located in the roadway are usually used to detect vehicles in places such as at a car park barrier. The roadway must be torn up to lay the induction loop and supply leads, and then repaved after these have been installed. Apart from the extremely cost-intensive installation required, induction loops are susceptible to damage, for example from shocks or if liquid penetrates the roadway through cracks. Furthermore, their operation is impeded by environmental conditions such as rain and fluctuations in temperature. Local factors, such as reinforced concrete in the roadway, also exert a negative influence on reliable operation.

It has therefore been proposed (EP 1193662 A1, DE 102 16 760 A1, German Patent Application 103 21 201.0) to use geomagnetic field sensors instead of induction loops to detect vehicles.

Because of the spherical detection characteristics of geomagnetic field sensors, however, they also detect vehicles in nearby lanes, for example vehicles in the lane behind the parking column at the barrier to a car park. There is no straightforward way to alter the directional detection characteristics of a geomagnetic field sensor so that it will only detect vehicles in the lane in front of the parking column. This is also a problem if the geomagnetic field sensor is located closer to the lane ahead of the parking column, or at least if a large, heavy vehicle is located in an adjacent lane on the other side of the parking column.

According to DE 101 23 223 A, a magnetic field sensor that detects changes in the combined magnetic field resulting from the geomagnetic field and superimposed static and dynamic background fields can be used to detect vehicles. The magnetic field sensor can be installed in a cavity in the roadway. It is provided with a permanent magnetic field in order to be able to establish a particular operating point.

SUMMARY OF THE INVENTION

The purpose of the invention is to reliably detect vehicles in a traffic lane using a simply constructed magnetic field sensor.

According to the invention, this is achieved by means of the device for detecting vehicles with a magnetic field sensor alongside a roadway, wherein a permanent magnet is positioned in the roadway at such a distance from the magnetic field sensor that the measurable magnetic field of the permanent magnet at the magnetic field sensor is stronger than the geomagnetic field, so that changes produced in the magnetic field of the permanent magnet by a vehicle exert a stronger effect on the magnetic field sensor than variations in the geomagnetic field, to reliably detect a vehicle in a targeted area.

The device according to the invention can be applied to a facility for controlling vehicles that include at least one barrier at a roadway and a parking column located in front of the barrier in the direction of travel. The device can also be used to register the number of vehicles, to monitor parking spaces, or to detect wheelchairs and baby strollers at a turnstile.

According to the invention, at least one permanent magnet is installed in the roadway at a suitable distance from the magnetic field sensor for the magnetic field of the permanent magnet to be measurably stronger than the geomagnetic field at the magnetic field sensor. According to the invention, in other words, the magnetic field of the permanent magnet overrides the geomagnetic field at the magnetic field sensor in such a way that the effects on the permanent magnet are stronger than any variations in the geomagnetic field.

In this way, a vehicle can be reliably detected with a magnetic field sensor placed alongside the lane, for example a vehicle located in the lane ahead of the parking column at a barrier. On the other hand, vehicles that are located beyond the parking column are at such a distance from the permanent magnet that they cannot influence its magnetic field, even if they are large and heavy.

A bar magnet, in other words a magnet with a greater length than diameter, is preferably used as the permanent magnet, for example one with a diameter of 5 to 20 mm but preferably less than 10 mm, and a length of 10 to 50 mm. All that is needed to install the bar magnet in the roadway is for a small hole to be drilled, which can be closed up again once the magnet has been inserted.

The distance between the permanent magnet and the magnetic field sensor can range from 30 to 100 cm, for example. In order to increase the range of the magnetic field sensor without having to increase the size of the permanent magnet, one or more secondary permanent magnets can be installed at right angles to the roadway at the same distance from the primary permanent magnet. The distance of the second permanent magnet from the primary permanent magnet, which is closest to the magnetic field sensor, is selected in such a way that any change in the magnetic field of the second permanent magnet is transferred to the magnetic field sensor by the magnetic field of the primary permanent magnet. By means of two or more permanent magnets connected in sequence in this way, the magnetic field sensor detects changes in the magnetic fields of all such interlinked permanent magnets. For example, with two such interlinked permanent magnets the range of the magnetic field sensor can be increased to between 80 and 150 cm, without increasing the sensitivity of the magnetic field sensor in the opposite direction, in other words its sensitivity to vehicles in the next lane on the other side of the parking column.

A simply constructed magnetic field sensor, such as a Fluxgate magnetic field sensor, can be used to detect the geomagnetic field. That is, the magnetic field sensor should have the same sensitivity as a geomagnetic sensor.

The device according to the invention can especially be installed at parking control facilities, where a barrier is located on a roadway with at least one lane and a parking column situated in front of the barrier in the direction of travel. A parking ticket or similar data carrier is used, on which the authorization to park or an authorization for an extended period is recorded once the parking charge has been paid. After the authorization recorded on the data carrier has been read and one of the magnetic field sensors at the parking column has detected a vehicle, a reading device for the data carrier activates the opening of the barrier. Another magnetic field sensor is installed at the barrier to detect a vehicle underneath the barrier and prevent the barrier from closing when a vehicle is still under it.

The magnetic field sensor at the parking column is preferably located close to or inside the parking column. The magnetic field sensor at the barrier is preferably located at or inside the base of the enclosure or at or inside the barrier boom. These magnetic field sensors can be installed at the factory. The device according to the invention can therefore be installed on site at modest expense and be quickly operational as a "plug and play" system. The magnetic field sensors located inside the parking column, enclosure base or boom can be enclosed in a chassis made of plastic or some other non-ferromagnetic material so they are not visible from the outside.

However, the invention is not restricted to activating a barrier. A door, such as a garage door, can also be used instead of a barrier for example.

The device according to the invention can additionally be used to count vehicles. For example, it can be installed at locations in a multistory car park or similar parking area where a lane branches, to record the number of vehicles traveling in each of the two directions. In a multistory car park, for example, a display can indicate that there are still a number of vacant parking spaces to the right, whereas no remaining parking spaces are available straight ahead or to the left.

In addition, the device according to the invention is suitable for surveillance of parking spaces. That is, magnetic field sensors can be used to determine whether a particular parking space is taken or vacant. These can be parking spaces in a multistory car park or similar parking area, or parking spaces on the street or in other public places. For example, the device according to the invention can be used at metered parking spaces on a street or in other such public place to indicate to a warden when a vacant parking space is taken, so that the warden can then visit the parking space to check that the parking fee has been paid.

If the device according to the invention is used to count vehicles or to monitor parking spaces, the magnetic field sensor can be located in a post alongside the roadway or on the sidewalk at the edge of the road.

However, the device according to the invention can detect wheelchairs and baby strollers as well as motor vehicles and other street vehicles in the narrower sense. A preferred application of the device according to the invention is therefore the detection of wheelchairs and/or baby strollers at turnstiles. The rotation speed of motor-driven turnstiles can be reduced accordingly, for example, if the device according to the invention detects a wheelchair or a stroller.

BRIEF DESCRIPTION OF THE DRAWINGS

In what follows, one embodiment of the device according to the invention is explained in greater detail based on the drawing.

DETAILED DESCRIPTION

Figure 1:
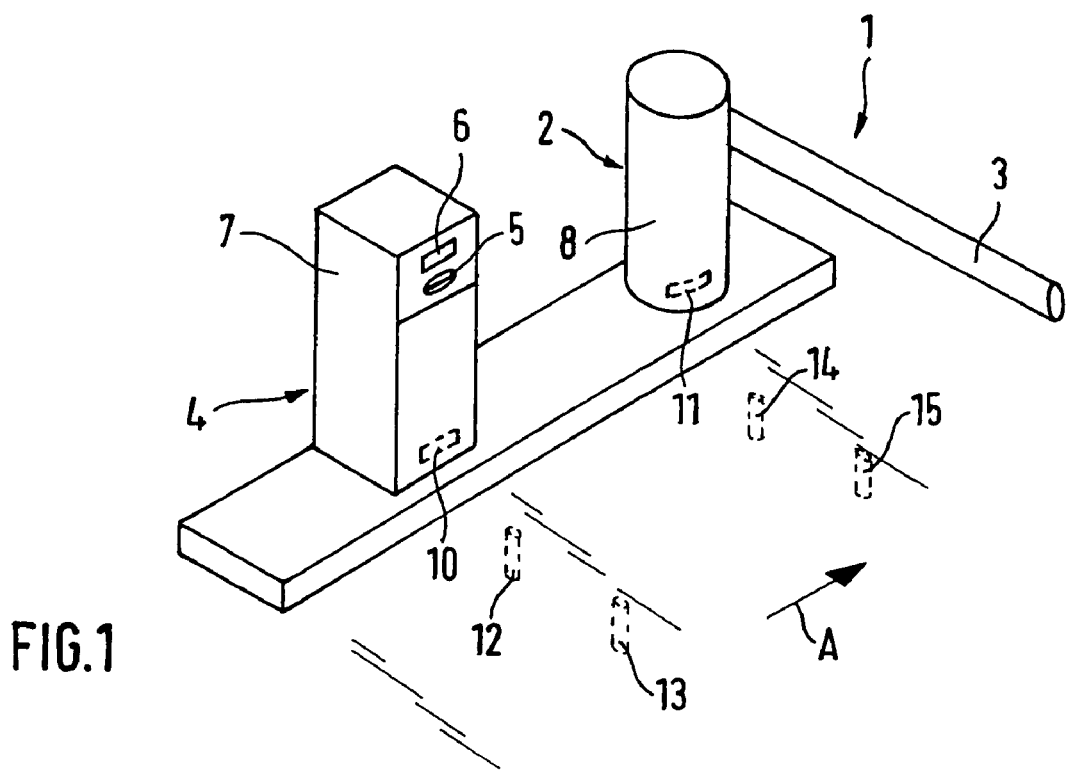
FIG. 1 is a perspective rendition of the exit from a parking garage.

According to FIG. 1, a barrier 1 with an enclosure 2 and a boom 3 are provided on an island alongside lane A at the exit from a parking garage, as well as a parking column 4 located in front of the barrier 1 in the direction of travel. The parking column 4 features a card slot 5 and a display screen 6. When exiting the parking garage, the parking ticket, which has a magnetic strip or similar device containing the authorization to leave the parking garage after payment has been made to a cashier or at an automatic machine, is inserted into the card slot 5.

Magnetic field sensors 10 and 11, shown as dotted rectangles, and the associated electronics, are located in the lower part of housing 7 of the parking column 4 and in the lower part of housing 8 of the enclosure base 2, adjacent to roadway A. The housing 7 of the parking column 4 and the housing 8 of the enclosure base 2, at least in the area of the magnetic field sensors 10 and 11, are made of a non-ferromagnetic material, such as plastic or an aluminum alloy.

Primary permanent bar magnets 12 and 14 at a distance a from the magnetic field sensors 10 and 11, and secondary permanent bar magnets 13 and 15 at a distance b, are inserted in roadway A. The permanent magnets 12 to 15 can exhibit a diameter of 8 mm and a length of 25 mm, for example. Distance a can be 50 to 60 cm, and distance b 100 to 120 cm, for example. The bar magnets 12 to 15 are represented as visible in FIG. 1. However, they are actually in cavities in the roadway and are therefore not visible.

Figure 2:
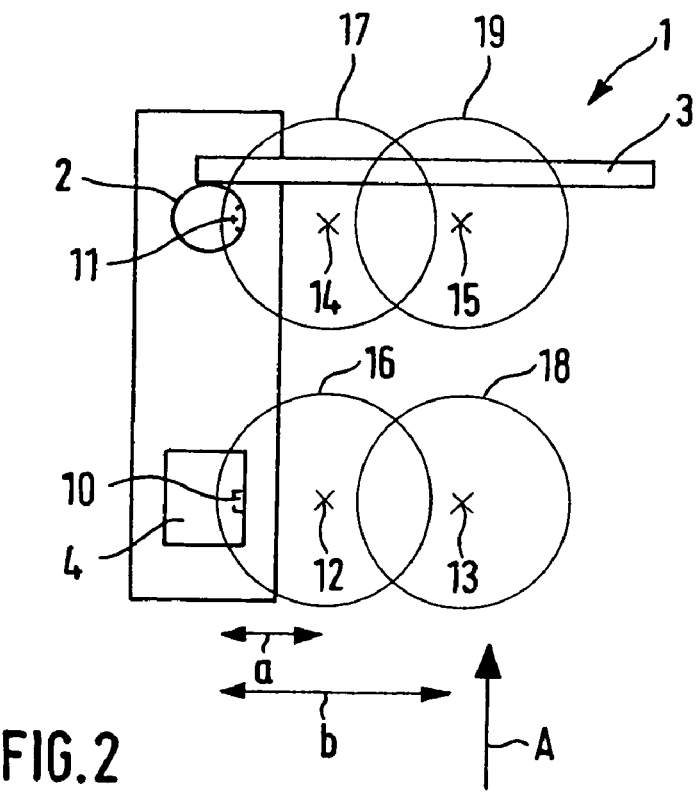
FIG. 2 is a bird's-eye view of the exit from above.

In FIG. 2 circles 16 to 19 represent the areas within which the permanent magnets 12 to 15 have a greater field strength than the geomagnetic field. That is, distance a is less than the radius of the circles 15 and 17, which represent the strength of the permanent magnets 12 and 14, and distance b is less than the sum of the radii of circles 16 and 18 or 17 and 19. This means there is a link right across roadway A between the magnetic fields 16 and 18, or 17 and 19. A change in the magnetic fields 18 or 19 of the additional permanent magnets 13 or 15 is transmitted to the magnetic sensors 10 or 11 by the magnetic fields 16 or 17 of the primary permanent magnets 12 or 14, so that the detection range of the sensors 10 and 11 corresponds to distance b.

The invention claimed is:

1. A device for detecting vehicles with a magnetic field sensor alongside a roadway, wherein a permanent magnet is positioned in the roadway at such a distance from the magnetic field sensor that the measurable magnetic field of the permanent magnet at the magnetic field sensor is stronger than the geomagnetic field, so that changes produced in the magnetic field of the permanent magnet by a vehicle exert a stronger effect on the magnetic field sensor than variations in the geomagnetic field, to reliably detect a vehicle in a targeted area.

2. A device according to claim 1, further comprising at least one additional permanent magnet positioned in the roadway at such a distance from the primary permanent magnet that a change in the magnetic field of the additional permanent magnet can be transferred to the magnetic field sensor via the magnetic field of the primary permanent magnet.

3. A device according to claim 1, wherein the magnetic field sensor a magnetic field sensor that is capable of detecting the geomagnetic field.

4. A device according to claim 1, wherein the permanent magnet is a bar magnet.

5. The application of the device according to claim 1 to a facility for controlling vehicles, having at least one barrier at a roadway and a parking column located in front of the barrier in the direction of travel.

6. The application of the device according to claim 1 in order to count the number of vehicles in a targeted area.

7. The application of the device according to claim 1 in order to monitor parking spaces.

8. The application of the device according to claim 1 in order to detect wheelchairs and baby strollers at a turnstile.

* * * * *

UNITED STATES PATENT AND TRADEMARK OFFICE
CERTIFICATE OF CORRECTION

PATENT NO. : 7,289,040 B2  Page 1 of 1
APPLICATION NO. : 11/251620
DATED : October 30, 2007
INVENTOR(S) : Gregor Ponert It is certified that error appears in the above-identified patent and that said Letters Patent is hereby corrected as shown below:

Column 4, line 51; change "the magnetic field sensor a magnetic field" to --the magnetic field sensor is a magnetic field--

Signed and Sealed this

Eleventh Day of March, 2008

JON W. DUDAS
*Director of the United States Patent and Trademark Office*